C. H. McCormick,
Mower.
No 519 Reissued Aug 3. 1858
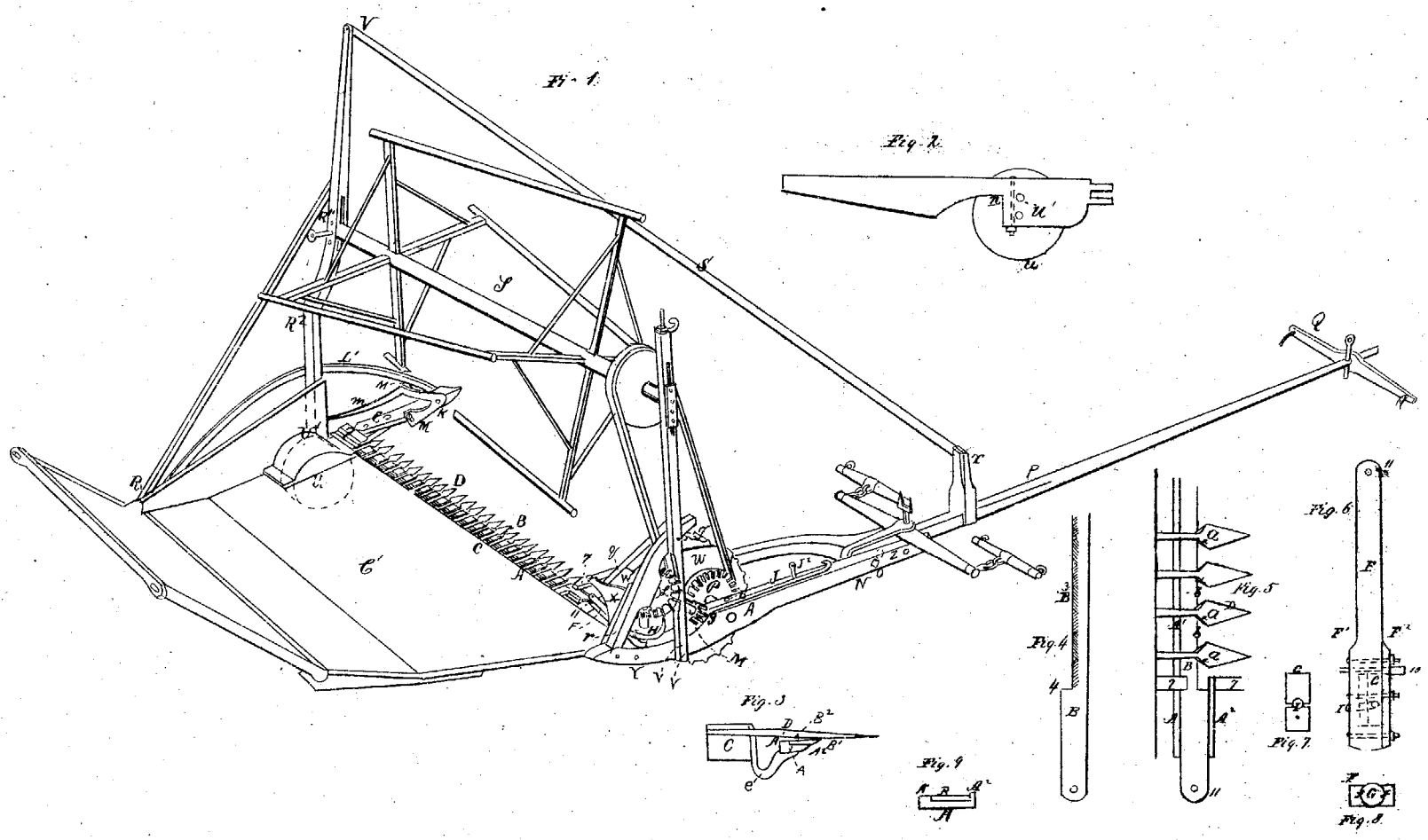

UNITED STATES PATENT OFFICE.

C. H. McCORMICK, OF CHICAGO, ILLINOIS.

IMPROVEMENT IN REAPING-MACHINES.

Specification forming part of Letters Patent No. 3,895, dated January 31, 1845; Reissue No. 579, dated August 3, 1858.

DIVISION B.

*To all whom it may concern:*

Be it known that I, CYRUS H. McCORMICK, of Chicago, in the State of Illinois, have invented certain new and useful Improvements upon my patented Reaping-Machine; and I do hereby declare that the following is a full, clear, and exact description of the construction and operation of the same, reference being had to the accompanying drawings, in which—

Figure 1 is a perspective view of my improved reaping-machine; Fig. 2, a section representing the sustaining-wheel on the left-hand or divider side of the machine. Fig. 3 is a vertical section taken through the cutting apparatus and one of the fingers, and in the direction of the length of one of the fingers; Fig. 4, a plan view of a portion of the length of the cutter, representing the sickle-edge with the teeth cut in sections and inclined in opposite directions in alternate sections. Fig. 5 is a plan of a portion of the length of the cutting apparatus, representing the form of the fingers and their relation to the cutter, mounted in the case in which it works. Figs. 6, 7, and 8 represent the connecting-rod and its appendages, and Fig. 9 is a cross-section of the cutter or blade and its case, taken at the line 1 2 of Fig. 5. All the sections are drawn to a larger scale than Fig. 1.

My invention consists in sustaining the cutting apparatus by bearers, which are so curved or bent downward as to let the stocks of grain and blades of grass, &c., that may get in work out.

The blade or cutter B is made flat and straight, with a portion of its length at each end wider and with square edges, as at 4, Figs. 4 and 5. The cutting portion of the front edge is beveled from the under face, as at B′, Fig. 3, and formed with sickle-teeth cut in sections and inclined in opposite directions in alternate sections, as represented in Fig. 4, that it may cut equally well in both directions and to avoid in part the tendency to clog, particularly when cutting damp grain.

The blade is mounted in a case, A, which is a straight plate of metal with a projecting shoulder or flange along its back edge, as at A′, Figs. 3, 5, and 9, equal in thickness to the thickness of the back of the blade, which flange forms a rest or support for the back of the blade to slide against. The ends of this case are made wider and with a shoulder or flange, $A^2$, Figs. 5 and 9, extending in front of the widened ends of the blade to form ways for it to slide in freely and accurately. By means of this arrangement the bottom and back of the blade are sustained along the entire length, and also sustained along the front edge at each end beyond the cutting-edge, and as the blade is made wider at the ends and sustained by the case there will be no danger of its getting out of place. The front edge of the narrow portion of the blade-case is beveled from the under side, as represented in Fig. 3, to prevent the accumulation of obstructing matter. This blade-case is connected with and secured to the front beam or finger-piece, C, of the platform C′ by an extension of the frame 7 7 (see Fig. 5) on each side, and between these points it is further sustained by bearers *e*, secured to its under side and to the forward part of the beam or finger-piece C, and just back of the back edge of the blade-case they are bent or curved down and then up again, leaving a considerable cavity for the clearance of an clogging matter which may enter between the cutter and the fingers and fall over the back.

Above the blade there are fingers D, the stems of which are secured to the front beam or finger-piece, C. These fingers are spear-shaped at their front end—that is, they are gradually wider from the point to within a short distance of the cutting-edge of the blade, and then gradually narrower to the stem back of the cutting-edge of the blade, as at A, Fig. 5. This form of fingers makes the open space between any two of them and between the widest part of the spears and the cutting-edge of the blade widest at the cutting-edge, so that the grain which enters between any two fingers will be crowded together until it passes the widest part of the spears, and then it will spread out, resting against the reversed angle of the spears, which thus present shoulders or supports in front of the cutting-edge to sustain the grain against the cutting action of the blade and prevent it from being forced forward as the blade vibrates, and by the reversed direction of its cutting-teeth cuts alternately in opposite directions, when moving in one direction cutting against the reverse angle on one side of the fingers, and when moving in the opposite direction cutting against the reverse angle on the other side of the fingers. The reverse angle of the fingers forms an acute angle with the line of motion of the cutter, which greatly facilitates the cutting of the grain. The blade should cut close to the under face of the fingers; but if there should be sufficient space between them for the entrance of stalks of grain, grass, and other clogging matter they will soon work their way back and fall over the back of the blade and blade-case, and whatever falls on the bearers will be freely discharged by reason of the downward bend or curve of the bearers, which leaves ample space for the free discharge. The cutting-blade receives the required reciprocating motion from a crank on the arbor of the fly-wheel H by means of a connecting-rod, F, and as the angle of the crank-axle to the plane of the blade is varied, when the machine is set with the cutting apparatus at different heights the box G of the connecting-rod, in which the crank-wrist works, is so constructed as to be capable of turning in the connecting-rod. To effect this that end of the connecting-rod is made in two parts, F′ F², connected by screw-bolts, as in Fig. 6. The part F′ is cut out to receive the two parts of the box G, which are rounded, as well as the inner face of the two parts F′ F², to admit of the turning of the box, as at *f f*, Fig. 8. One part of the box is forced toward the other to fit the crank-wrist by a wedge, 10, Fig. 6. The crank receives motion from the driving ground-wheel T by a master bevel-wheel, P, on the axle of the driving-wheel, which master cog-wheel drives a beveled pinion on an inclined axle that carries a bevel cog-wheel, L, which in turn drives a bevel-pinion (not shown in the drawings) on the crank-axle of the fly-wheel H, and for the purpose of throwing the crank out of gear, that the machine may be moved without operating the cutter, the lower end of the inclined axle of the bevel-wheel L turns in a lever, J, one end of which is hinged to the top and near the rear end of the outer hound, N, and the other end is held in place by a pin, J², which passes through the lever and into the hound. By taking out this pin and moving that end of the lever outward the pinion on the axle of the wheel L is ungeared from the master-wheel P, so that the ground-wheel can turn without operating the cutter.

The axle of the driving ground-wheel is mounted in the two hounds N N, which hounds are connected with the frame of the platform C′ by bolt-joints, so that by shifting the bolts in holes made of different heights in manner well known the cutting apparatus and appendages can be set at a greater or less height from the ground. In doing this it is necessary at the same time to shift the connection of the tongue P′ with the hounds, which is in like manner made by means of bolt-joints, so that by shifting the bolts the angle of the tongue, with the plane of the hounds, can be shifted at pleasure.

The opposite or divider side of the machine is sustained on a ground-wheel, U, mounted in beams U′, (see Fig. 2,) which are in like manner connected with the frame of the platform C′ by bolt-joints, which can be shifted to set the cutting apparatus at any desired height from the ground.

On the left side of the machine there is a divider to divide the grain and bring that portion of it which is to be cut within reach of the ribs of the wheel S, to be separated, when tangled, from the grain which is to be left standing. This divider may be composed of a pointed piece of scantling, E, which projects some distance forward of the cutter, to which is secured a bow, L′, outside, one end of which is secured to the scantling near the point, gradually bent outward and rising, and the other end secured at R to the platfrom; and on the inside there is an iron, M, attached to the scantling E and bent upward and inward, extending under the reel to bring the grain to be cut within the action of the reel-ribs; and the better to effect this purpose the rear part of this iron is curved, as at M, so as to correspond, or nearly correspond with the circle described by the reel-ribs in their revolution. By forming this divider with a point at about the level of the cutting apparatus to trace the division which is to be made between the grain to be cut and that to be left standing, and by having it with two diverging lines from the point back, one or both of which are elevated as they extend back, the grain is gradually divided and, if lodged or leaning, elevated, and that to be left standing bent outward away from the reach of the reel, while the portion which is to be cut is acted upon by the reel-ribs and properly carried to the action of the cutter, and if tangled with the grain to be left standing a sufficient open space is formed by the two lines of the divider between the two portions of grain, in which space the ends of the reel-ribs sweep around to act only on that portion of the grain which is inside of the divder that the separation from the grain to be left standing may be effected by the power of the reel.

To avoid all impediment to the required separation of the grain, the reel-post R′ is bent and set back, as at R².

To prevent the gearing from being clogged by sand, earth, and straw, proper guard-boards W *w* are placed between the driving ground-wheel and the master cog-wheel, and between it and the cutting apparatus, and another, X, is placed between the gearing and the platform C′.

What I claim as my invention, and desire to secure by Letters Patent, is—

The downward curve or bend, substantially as described, of the beams that support the cutting apparatus to facilitate the discharge of any clogging matter that may enter, as set forth.

C. H. McCORMICK.

Witnesses:
THOMAS C. DONN,
D. WESTERFIELD.